United States Patent [19]

Rothenberg

[11] Patent Number: 4,555,441
[45] Date of Patent: Nov. 26, 1985

[54] SELF-ADHESIVE WALL COVERING OR THE LIKE AND METHOD OF MAKING SAME

[75] Inventor: Irwin P. Rothenberg, Oceanside, N.Y.

[73] Assignee: Stik-Trim Industries, Incorporated, New York, N.Y.

[21] Appl. No.: 708,674

[22] Filed: Mar. 6, 1985

[51] Int. Cl.⁴ .............................................. B32B 27/00
[52] U.S. Cl. ..................................... 428/284; 156/71; 156/249; 156/271; 156/280; 156/344; 428/286; 428/343; 428/354; 428/355; 428/904.4; 428/914
[58] Field of Search ............... 156/249, 344, 271, 280, 156/71; 428/246, 284, 343, 352, 354, 355, 904.4, 914, 286

[56] References Cited

U.S. PATENT DOCUMENTS 3,130,113  4/1964  Silman ............................... 428/904.4
4,161,563  7/1974  Metzger ............................. 428/354
4,296,162  10/1981 Jean .................................. 428/354

FOREIGN PATENT DOCUMENTS 2054472  2/1981  United Kingdom ............ 428/904.4

Primary Examiner—James J. Bell
Attorney, Agent, or Firm—Curtis, Morris & Safford

[57] ABSTRACT

A self-adhesive wall covering or the like that is easily removable from a wall. The wall covering consists essentially of a laminate structure formed of a layer of fabric having a visible pattern on one side and an acrylic-saturated paper adhesively fixed to the other side. A layer of PVA adhesive is coated onto the acrylic-saturated paper and a layer of release paper is secured to the PVA adhesive as protection and to prevent inadvertent adhesion of the laminate wall covering to a surface. When the release paper is removed, the PVA adhesive is exposed and serves as the medium by which the wall covering adheres to the wall.

9 Claims, 2 Drawing Figures

SELF-ADHESIVE WALL COVERING OR THE LIKE AND METHOD OF MAKING SAME

BACKGROUND OF THE INVENTION

This invention relates to a self-adhesive wall covering or the like and a method of making same and, more particularly, to a laminate wall covering (or the like) that is easily removable from a wall and that includes a fabric (as opposed to paper) as its outer layer.

Wall coverings are formed typically of paper material having a pattern or design on one surface, the other surface, or backing, being coated by the user with a suitable adhesive, such as glue, cement, or the like (typically known as "wallpaper paste") by which the wall covering may be secured to a wall, ceiling or other surface. Other types of wall coverings are formed of fabric, such as cotton, polyester and cotton, a polyester blend, or the like, having a design or pattern formed on what is typically referred to as the front surface and whose rear surface is adapted to be coated by the user with the aforementioned adhesive in order to secure the fabric-type wall covering to a surface.

Generally, in both types of wall coverings, once the wall covering is applied to the surface, it may be shifted or adjusted thereon to a limited degree until the adhesive cures, or dries. Thereafter, it is difficult, if not impossible, to remove the wall covering from the surface without the use of additional tools or artificial means. For example, it is known to "steam" the aforementioned types of wall coverings to remove them from the surface to which they adhere. Also, chemicals are available to "strip" the wall covering from that surface. Finally, mechanical scraping tools may be used to remove the wall covering. Unfortunately, even when extreme care is utilized, portions of the wall covering, such as its "backing", nevertheless may remain secured to the surface from which the wall covering is to be removed.

It is desirable to provide a fabric-type wall covering that is manufactured with a suitable adhesive backing, thus resulting in a so-called self-adhesive wall covering that may be applied to a surface without requiring the use of additional cement, glue or wallpaper paste. Although suitable pressure-sensitive adhesives have been applied to paper wall coverings, attempts to utilize those same adhesives with fabric-type wall coverings (i. e. wall coverings made of cotton, flannel, or the like) generally have not met with success. Typically, fabric-type wall coverings having self-adhesive backings have fallen from the walls to which they were applied shortly after such application. Because of the improved appearance and overall effect that is attained by the use of fabric-type wall coverings, it is desirable to provide such a fabric-type wall covering that self-adheres to a surface. It is readily appreciated that a self-adhesive wall covering avoids the task and mess associated with conventional wall coverings that require application thereto of cement, glue or wallpaper paste by the user in order to apply, or "hang", that wall covering.

OBJECTS OF THE INVENTION

Therefore, it is an object of the present invention to provide a self-adhesive fabric-type wall covering or the like that avoids the disadvantages and defects noted above.

Another object of this invention is to provide a laminated self-adhesive wall covering formed essentially of a layer of fabric, an acrylic-saturated paper adhesively fixed to the fabric and a PVA adhesive coated onto the acrylic-saturated paper, the adhesive serving as the medium by which the fabric adheres to a surface.

A further object of this invention is to provide a method of producing a wall covering of the aforementioned type.

An additional object of this invention is to provide a self-adhesive fabric-type wall covering that is easily adjustable on and removable from a surface.

Various other objects, advantages and features of the present invention will be readily apparent from the ensuing detailed description, and the novel features will be particularly pointed out in the appended claims.

SUMMARY OF THE INVENTION

In accordance with this invention, a self-adhesive fabric-type wall covering or the like that is easily removable from a wall consists essentially of a layer of fabric (such as cotton, polyester and cotton, a polyester blend, rayon, or the like) having a visible pattern on one surface and an acrylic-saturated paper adhesively affixed to its other surface. A layer of PVA adhesive is coated onto the acrylic-saturated paper and serves as the medium by which the wall covering adheres to a surface, such as a wall. To protect the PVA adhesive and to prevent inadvertent adhesion, or sticking, of the wall covering other than when desired, a layer of release paper is removably secured to the PVA adhesive; and when that release paper is removed, the PVA adhesive is exposed and is adapted to secure the wall covering to a surface.

The method of producing the aforementioned self-adhesive fabric-type wall covering also is disclosed.

BRIEF DESCRIPTION OF THE DRAWINGS

The following detailed description, given by way of example, and not intended to limit the present invention solely to the embodiment described herein, will best be understood in conjunction with the accompanying drawings in which.

DETAILED DESCRIPTION OF A PREFERRED EMBODIMENT

Figure 1:
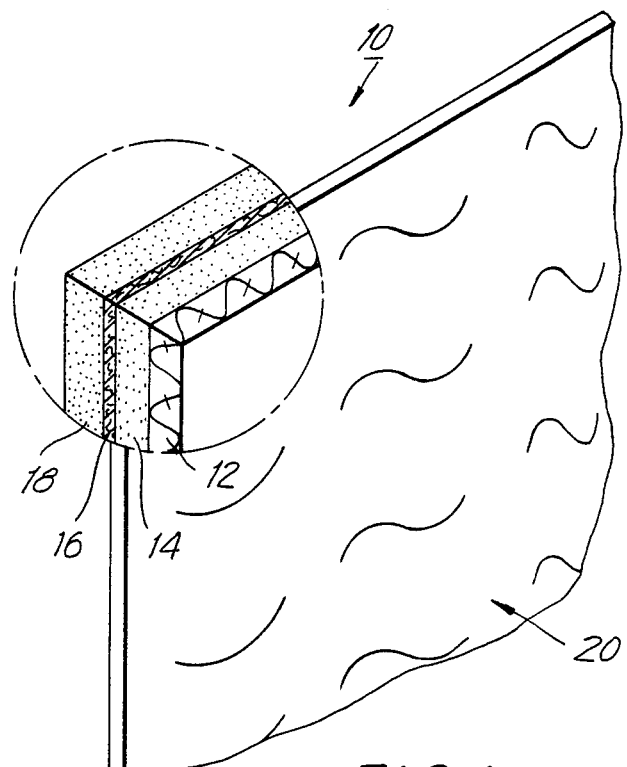
FIG. 1 is a partially magnified perspective view of a preferred embodiment of the wall covering in accordance with the present invention.

Referring now to FIG. 1, there is illustrated a preferred embodiment of the laminated construction of the fabric-type wall covering of the present invention. This wall covering 10 preferably is in the form of a web having a width on the order of about four inches, although wider webs (or sheets) may be used. It is appreciated that this wall covering may be used as a border, trim or the like on any suitable surface, such as a wall, ceiling, etc.

Wall covering 10 is formed of a layer 12 of fabric, the fabric preferably being formed of cotton, polyester and cotton, a polyester blend, rayon, polyester rayon, or the like. By utilizing a fabric as opposed to paper, wall covering 10 provides a finer, more elegant appearance. Fabric 12 specifically is not constructed of paper.

The front surface, that is, the surface that is visible once wall covering 10 is applied to, for example, a wall, has a visible pattern 20 formed thereon. This pattern may be silk-screened or printed in any other conventional manner, and the particular technique for printing or otherwise forming the pattern forms no part of the present invention per se.

The rear surface of fabric layer 12, that is, the surface that is not visible once wall covering 10 is applied to a wall, has an acrylic-saturated paper 14 adhesively affixed thereto by suitable means, such as a suitable cement or glue that normally is used to adhere paper to fabric. Preferably, the acrylic-saturated paper is formed as white acrylic-saturated paper such as 4 mil acrylic binder saturated paper manufactured by Kimberly-Clark.

A layer of PVA adhesive 16 is coated onto acrylic-saturated paper 14. It is appreciated that the PVA adhesive should not be applied directly to fabric 12 because, if so applied, it would leach through the fabric to the front viewable surface thereof, thus interfering with pattern 20. Stated otherwise, the leached adhesive would destroy the appearance of the wall covering but for the provision of acrylic-saturated paper 14. PVA adhesive 16 preferably is a water-based polyvinyl acetate adhesive.

It is appreciated that PVA adhesive 16 is pressure sensitive. To protect this adhesive from contamination or dirt, and to avoid inadvertent adherence of wall covering 10 to a surface or to an article other than that specifically intended by the user, a layer of release paper 18 is secured to the PVA adhesive. The release paper may be suitably coated, for example, with silicone as is conventional, so as to be easily removable from the PVA adhesive merely by peeling the paper away therefrom. Of course, once release paper 18 is removed, PVA adhesive 16 is exposed and serves as the medium by which wall covering 10 is adhesively applied to a surface. Preferably, the release paper is a fully bleached polyethylene paper with glossy finish and coated with silicone.

The manner in which wall covering 10 may be produced now will be described. It is appreciated that fabric 12 and acrylic-saturated paper 14 may be prepared separately. A suitable conventional glue may be applied by an application roller to one surface of the acrylic-saturated paper and the glued acrylic-saturated paper is pressed against the rear surface of fabric 12, as by passing the fabric and paper over heated rollers to fuse the paper to the fabric. Thereafter, PVA adhesive 16 may be applied by an application roller to the other side, or surface of the acrylic-saturated paper, and then release paper 18 is applied to the PVA adhesive, resulting in the construction shown in FIG. 1. As an alternative, release paper 18 may be applied to the PVA adhesive prior to adhering acrylic-saturated paper 14 to fabric 12.

Figure 2:
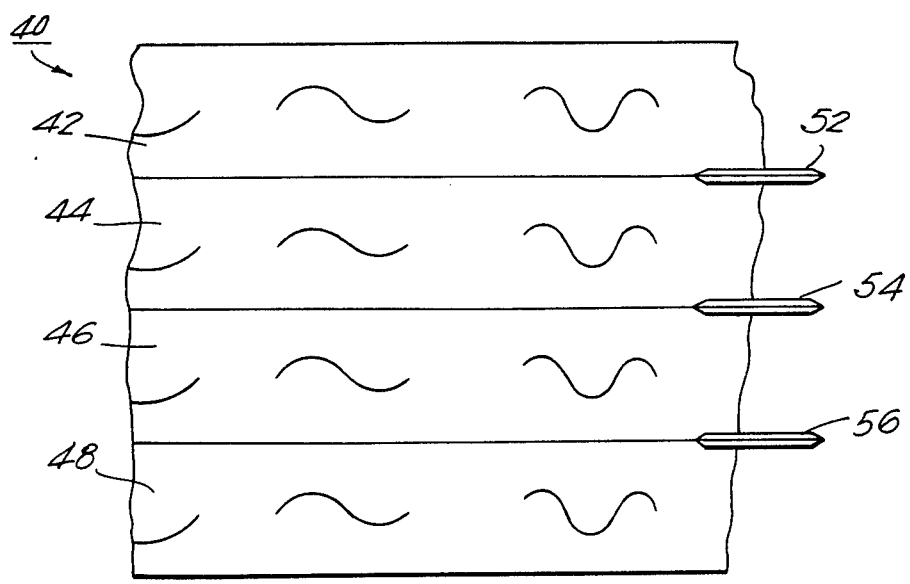
FIG. 2 is a schematic representation of the manner in which the wall covering of this invention may be formed.

Preferably, the wall covering shown in FIG. 1 is prepared as a much wider web, such as shown in FIG. 2. As an example, several rows of pattern 20 may be provided across the width of the web. As shown in FIG. 2, such a relatively wide web 40 is formed of adjacent rows 42, 44, 46, 48, etc., each row having a distinctive pattern. If desired, the very same pattern may be replicated from row to row.

The wide web 40, shown in FIG. 2, then may have the laminate formed of acrylic-saturated paper, PVA adhesive and release paper secured to the rear surface thereof in the manner mentioned above. Then, the individual rows 42, 44, 46, 48, etc. are separated by advancing the relatively wide web 40 longitudinally past suitable cutting blades, or wheels, 52, 54, 56, etc. As web 40 advances, these cutting blades serve to slit the web longitudinally to divide that web into respective webs of smaller width, each such web corresponding to the structure shown in FIG. 1.

It is recognized that suitable automatic mechanisms may be used to provide the respective layers shown in FIG. 1 and to press those layers together in order to form the laminated structure. That is, one surface of the acrylic-saturated paper may be coated with a layer of glue either by an automatic coating mechanism, such as an application roller, or, if desired, this glue coating may be applied manually. The acrylic-saturated paper having the glue coating thereon then may be pressed against fabric 12, again either by automatic mechanisms, such as by heated rollers, or manually, to adhesively affix the fabric to the acrylic-saturated paper. Then, the PVA adhesive may be coated onto the acrylic-saturated paper and the release paper thereafter may be applied to that adhesive. Alternatively, and as mentioned above, the laminated structure comprised of the acrylic-saturated paper, the PVA adhesive and the release paper may be formed as a separate unit, and this separate unit then may be glued to the rear surface of the fabric.

Preferably, the glue which may be used to adhere the acrylic-saturated paper to the fabric is applied to the acrylic-saturated paper by way of a conventional application roller. Also, an application roller preferably is used to coat the acrylic-saturated paper with the PVA adhesive.

The foregoing has described a laminated fabric-type wall covering that is easily removable from a wall, ceiling or other surface. The acrylic-saturated paper is firmly secured to the fabric, and the PVA adhesive which is coated on the acrylic-saturated paper permits the wall covering to be adjusted on the wall or ceiling (or other surface) and also permits that wall covering to be removed relatively easily therefrom. The acrylic-saturated paper prevents the PVA adhesive from leaching through to the viewable surface of the fabric.

While the present invention has been particularly shown and described with reference to a preferred embodiment, it will be readily appreciated by those of ordinary skill in the art that various changes and modifications in form and details may be made without departing from the spirit and scope of the invention. It is, therefore, intended that the appended claims be interpreted as including such changes and modifications.

What is claimed is:

1. A self-adhesive wall covering or the like that is easily removable from a wall, consisting essentially of a layer of fabric having a visible pattern on one surface thereof; an acrylic-saturated paper having one surface adhesively fixed to the other surface of said fabric; a layer of PVA adhesive coated onto the other surface of said acrylic-saturated paper; and a layer of release paper removably secured to said PVA adhesive such that when said release paper is removed to expose said PVA adhesive, the wall covering is adherable to a wall by means of the exposed PVA adhesive.

2. The invention of claim 1 wherein said acrylic-saturated paper is white acrylic-saturated paper to avoid interference in the observation of the visible pattern when said wall covering is adhered to the wall.

3. The invention of claim 1 wherein said PVA adhesive is a water-based polyvinyl acetate.

4. The invention of claim 1 wherein said fabric consists essentially of a polyester and cotton.

5. A self-adhesive wall covering or the like that is easily removable from a wall and formed by the process of providing a web of fabric; forming on one surface of said web of fabric a visible pattern; providing a web of acrylic-saturated paper; coating one surface of said acrylic-saturated paper with a layer of glue; pressing the other surface of said fabric and the glue-coated surface of said acrylic-saturated paper together to adhesively fix said web of fabric to said web of acrylic-saturated paper; coating the other surface of said acrylic-saturated paper with a layer of PVA adhesive; and releasably adhering a web of release paper to the layer of PVA adhesive.

6. The invention of claim 5 wherein said PVA adhesive is a water-based polyvinyl acetate.

7. A method of producing a wall covering adapted to adhere to and be easily removed from a wall, comprising the steps of: forming on a surface of a web of fabric plural rows of visible patterns; glueing to the other surface of said fabric a web of acrylic-saturated paper; coating the exposed surface of said acrylic-saturated paper with a layer of PVA adhesive; applying to said layer of PVA adhesive a removable web of release paper thereby forming a laminate; and slitting the laminate of fabric, acrylic-saturated paper and release paper longitudinally to form individual multiple-layered webs each corresponding to a respective row of visible pattern.

8. The method of claim 7 wherein said step of glueing said web of acrylic-saturated paper to said fabric comprises coating said web with glue and passing said web and fabric between heated rolls.

9. The method of claim 7 wherein said step of coating said acrylic-saturated paper with said PVA adhesive comprises rolling said PVA adhesive onto said acrylic-saturated paper.

* * * * *